March 6, 1956 J. W. AUGUSTIN 2,737,545

METHOD AND DEVICE FOR TRANSMITTING CODE SIGNALS

Filed Oct. 28, 1950 11 Sheets-Sheet 1

INVENTOR.
JOHANN W. AUGUSTIN
BY
Robert Harding Jr.
ATTORNEY

March 6, 1956 J. W. AUGUSTIN 2,737,545

METHOD AND DEVICE FOR TRANSMITTING CODE SIGNALS

Filed Oct. 28, 1950 11 Sheets-Sheet 2

INVENTOR.
JOHANN W. AUGUSTIN
BY
Robert Harding Jr
ATTORNEY.

March 6, 1956 J. W. AUGUSTIN 2,737,545

METHOD AND DEVICE FOR TRANSMITTING CODE SIGNALS

Filed Oct. 28, 1950 11 Sheets Sheet 3

INVENTOR.
JOHANN W. AUGUSTIN
BY
Robert Harding Jr.
ATTORNEY.

March 6, 1956 J. W. AUGUSTIN 2,737,545

METHOD AND DEVICE FOR TRANSMITTING CODE SIGNALS

Filed Oct. 28, 1950 11 Sheets-Sheet 4

INVENTOR.
JOHANN W. AUGUSTIN
BY Robert Harding Jr.
ATTORNEY

March 6, 1956 J. W. AUGUSTIN 2,737,545

METHOD AND DEVICE FOR TRANSMITTING CODE SIGNALS

Filed Oct. 28, 1950 11 Sheets-Sheet 5

INVENTOR.
JOHANN W AUGUSTIN
BY
Robert Harding Jr.
ATTORNEY.

March 6, 1956 J. W. AUGUSTIN 2,737,545

METHOD AND DEVICE FOR TRANSMITTING CODE SIGNALS

Filed Oct. 28, 1950 11 Sheets-Sheet 6

INVENTOR.
JOHANN W. AUGUSTIN
BY
Robert Harding Jr.
ATTORNEY

INVENTOR.
JOHANN W. AUGUSTIN
BY Robert Harding Jr.
ATTORNEY.

March 6, 1956 J. W. AUGUSTIN 2,737,545

METHOD AND DEVICE FOR TRANSMITTING CODE SIGNALS

Filed Oct. 28, 1950 11 Sheets-Sheet 8

INVENTOR.
JOHANN W. AUGUSTIN
BY
Robert Harding Jr.
ATTORNEY.

March 6, 1956 J. W. AUGUSTIN 2,737,545

METHOD AND DEVICE FOR TRANSMITTING CODE SIGNALS

Filed Oct. 28, 1950 11 Sheets-Sheet 9

INVENTOR.
JOHANN W AUGUSTIN
BY Robert Harding Jr.
ATTORNEY

METHOD AND DEVICE FOR TRANSMITTING CODE SIGNALS

Filed Oct. 28, 1950 11 Sheets-Sheet 10

INVENTOR.
JOHANN W. AUGUSTIN
BY Robert Hardy Jr.
ATTORNEY.

March 6, 1956 J. W. AUGUSTIN 2,737,545

METHOD AND DEVICE FOR TRANSMITTING CODE SIGNALS

Filed Oct. 28, 1950 11 Sheets-Sheet 11

INVENTOR.
JOHANN W. AUGUSTIN
BY
Robert Harding Jr.
ATTORNEY

United States Patent Office 2,737,545

Patented Mar. 6, 1956

2,737,545

METHOD AND DEVICE FOR TRANSMITTING CODE SIGNALS

Johann W. Augustin, Hannover, Niedersachsen, Germany, assignor to International Standard Electric Corporation, New York, N. Y., a corporation of Delaware Application October 28, 1950, Serial No. 192,716

Claims priority, application Germany October 29, 1949

23 Claims. (Cl. 178—3)

It is known, f. i. for teleprinters, to communicate by code signals in a way that the individual signals are composed from two kinds of signal elements on the combination principle. The individual signal elements are transmitted successively in a way typical of the used code alphabet and the character to be transmitted.

With the methods so far in general use and termed pulsed telegraph system, the two kinds of signals elements are symbolized by the terms "white" and "black," respectively. If a start-stop teleprinter alphabet is taken as a basis of this discussion, each code signal will begin with a white start signal element and terminate with a black stop signal element. The intermediate five black or white signal elements combine in a way representative of each character to form the code signal proper. In single-current operation, a white signal element is set up by breaking the closed-circuit current, hence by a no-current condition, while black on the contrary refers to current flowing. In double-current operation it is customary to transmit "white" by applying minus and "black" by applying plus polarity. This correlation is arbitrary and might be chosen the other way around as well. Unlike the known method of code signals transmission, the various kinds of signal elements composed on the combination principle are transmitted under this invention by the device that one kind of signal elements is characterized by having the same value as the foregoing signal element while the alternative kind of signals has another value relative to the foregoing signal element, and that at the beginning of a start element, the start element has invariably a value different from the foregoing combination element no matter what the absolute value of the latter had been. With the method under this invention it does not matter whether the kinds of signal elements are set up by current or no-current, by plus or minus, by plus/minus or zero, or by plus/minus or no-current, or by frequencies. When two different types of signal elements are used, the elements comprised in a signal except the starting element are center-scanned and the last element is also used herewith for evaluating the signal combination. Where three or more kinds of signal elements are used however, the elements contained in a signal are center-scanned, and the last element is also used for evaluating the signal combination. With the method under this invention the signal combination transmitted over the circuit is identical with the so far known code alphabets as to sequence and length of the individual signal elements, and it symbolizes the same character. By evaluating the last current pulse of a code signal as a signal combination additional, possible combinations are given under this invention for enlarging the known code alphabets. The advantage has thus been achieved that f. i. a six element code, hence a higher-order alphabet, is set up while as to length it is equivalent to a five element code. It will be observed herewith that in the so gained aforenamed six element code the telegraph speed has been achieved with all of the safety margins of a five element code. The method under this invention may be termed inverted telegraphy as the one kind of signal elements is made up by a change in the conditions on the teletypewriter circuit, i. e. breaking or closing the closed circuit, or by a polarity reversal in double-current operation, while the other kind of signal elements is represented by continuity of the existing current condition on the teletypewriter circuit and the absolute condition as such is of no importance at all.

Translation of code signals from the pulsed telegraph method to the inverted telegraph method is accomplished under this invention not by translating white f. i. into a cross and black f. i. into an equals sign, but by considering the now common code signals in terms of their wave form as a current-time diagram, and by representing this current wave by the symbols of inverted telegraphy. If in such a translation process, the code signals of the inverted telegraph method are assigned the same characters, the inverted telegraph method may be used for its larger number of possible combinations, as mentioned above, for enlarging the now used code alphabet. Intercommunication of the two code systems is then possible provided certain conditions are met which will be specified later on, without changes on existing sets operating on the known code method. For practicing the new method it is further suggested to use a device for transmitting and receiving the code signals where a receiving solenoid provided with two magnet cores has four windings which, through two sending contacts and the transfer contact of the receiving relay inserted in the incoming line, are so connected with the incoming and outgoing lines that upon operation of the transfer contact the receiving solenoid transfers its armature but the polarity in the outgoing line is maintained, while upon operation of the sending contact the armature of the receiving solenoid transfers as well but the polarity in the outgoing line is reversed simultaneously. The sending contacts and the contact on the receiving relay are electrically so connected with the receiving solenoid herewith that the incoming code signals affect the receiving solenoid alone while the outgoing code signals affect the outgoing line as well as the receiving solenoid. It is necessary to ensure that the equipment is ready for receiving and sending no matter what the phases of the incoming and outgoing signals. It is not necessarily required that as a receiving solenoid system be used a solenoid having two magnet cores and four windings, one may rather on the one hand provide special contact systems which ensure that the polarity in the magnet cores has the proper relative phase, so it is only two windings that are still needed, and by resistances dependent on current polarity one may accomplish on the other hand that even in this case only two windings are needed on the magnet cores.

For sending the code signals, a device is suggested according to another feature of this invention where a rotating disc operates two contacts under each revolution in a way that during the first half-revolution the one contact is closed, the other opened, while these conditions are in the reverse during the second half-revolution, and where the disc carries one or two coupling noses which face a steadily spinning movable clutch section with one or two coupling noses. This clutch unit is driven by a motor, while a control organ may displace it axially. Depending upon the position of the control organ, the contact disc engages, or not, the clutch. Through the control organ it may be engaged or disengaged at will. Provided the sending contacts are properly adjusted, current pulses of equal durations and alternating polarities are transmitted by the sending contacts when the clutch is engaged and the drive operates uniformly. If by actuation of the control organ, the clutch is disengaged temporarily, such temporary disengagement can be only an integer multiple of a half revolution since in each revolution each contact is opened and closed just once; in an analogous manner, the opening and closing times, respectively, are integer multiples of a current pulse. All inaccuracies that may be present on the control organ for bearing take-up and production errors, bouncing, etc., will not affect the duration of the current pulses. The sending distortion of the emitted signals becomes thus exceedingly small. The arrangement under this invention provides thus over the so far known method the advantage that the contact acceleration is approximately sinusoidal and that bouncing is thus avoided, and that besides no preparatory contacts are necessary. Furthermore, no distributor wafers with revolving wipers are required which tend to give rise to faulty currents between contact segments, and which become readily useless due to careless handling of the contacting wiper in servicing. Besides, this method permits to segregate the contact in the minus wire from that in the plus wire which introduces the possibility of assigning the contacts to different circuits.

To receive the code information transmitted under this invention, a system is suggested according to another feature of this invention, where an actuating organ has been provided controlling the receiving control bushing as well as the receiving decoding components which is so affected by an armature that, no matter what the actual direction of movement the armature, the organ performs the same movement in the same direction. It is thus not the absolute position of the armatures that is used for controlling the receiving decoding components but changes in the position relative to that of the foregoing signal elements. This introduces the advantage that a fully defined line-up of code bar position is correlated with every character. In this receiving solenoid system, the first shift in armature position triggers the receiving control bushing to go through one revolution while the following changes in armature position of the receiving solenoid are evaluated for decoding. The code sword levers are set by a control lever. By the cams of the receiving control bushing this control lever is always restored to normal and held there. The control lever can shift position only when the receiving solenoid shifts its armature in any direction at the moment a cam depression of the receiving control bushing slides by. As mentioned above, the next cam of the receiving control bushing restores the control lever to normal, to keep it there. Even with receiving systems which use a decoding system operating on the addition principle for setting a type wheel or similar organs, this receiving solenoid system may find use to advantage. With this receiving system a number of clutches must be triggered in succession where each unit causes rotation of the type wheel through a different angle. For instance the first triggering will cause the receiving control bushing to start out, while the second will rotate the type wheel through half a revolution, the third through ⅛-revolution, etc., depending on the alphabet at hand.

According to another feature of this invention, there may be used as a receiving equipment a device which comprises two solenoids assigned to one or several armatures which upon energization of one solenoid bring the armature(s) to the position assigned to the respective solenoid while upon energization of the other solenoid the armature(s) take(s) the alternative position, and with both solenoids de-energized the armature(s) stay(s) where it/they had been last. The armature carries a nose and a selecting arm which in interplay with the code sword levers serves for exploring the combination steps. The triggering device of the receiving shaft is operated by the aforementioned nose. The action deviates from that of the so far known kind insofar as the receiving shaft is not triggered when the armature restores but at the time the armature passes through its center position, no matter whether it travels left to right or right to left herewith. In addition to the code sword levers with their operating and control levers for exploring the combination pulses, there exists one more set of code swords for exploring the start step. The code swords for the combination steps actuate through intermediate links in the known manner a corresponding number of code bars. With the arrangement under this invention, the same layout has been provided for the code sword exploring the start step, so f. i. with the five element code there exist 7 code bars, and 8 code bars with the six element code. Unlike the known arrangements, the code bars act no longer as previously on one, but on two type bars for each type lever. In such an arrangement, the correlated type bars are joined flexibly, and as they drop into the code bars they affect the same type lever. Under another feature of this invention, the receiving code bars are provided with two rows of slots, and the one of two type bars assigned to one type lever drops in the upper, the other in the lower, slots (slot pattern of the receiving code bar). The upper code bar profile is just the mirrored image of the lower profile. With the receiving code bars so shaped under this invention, one achieves the advantage that the receiving code bars are shorter in length while on the other hand their travel is extended. Thus the requirements on slotting accuracy in production are no longer as exacting as previously while the effective overall slotting efficiency is improved. It is useful to arrange on straight code bars the slots in two parallel rows, and on curved code bars along two concentric circular arcs. It is common practice to arrange a registering device between the keyboard and the sender of a teleprinter which receives and registers the characters typed out on the keyboard to forward these registered characters at the maximum safe transmission rate to the sender. Due to non-uniform keying speed and typing intermissions, the register is drained rapidly enough so one is not bound to any time-keeping in teletypewriting. To register such information, it is known to use a disc holding axially movable pins. The pins are arranged to form 24 radial rows, and the register and the exploring organ are stepped by way of a ratchet and pawl mechanism; the exploring organ scans the setting pattern of the pins and controls the sender. As in these known register devices the motional pattern of the individual organs is extraordinarily elaborate, a particularly high degree of accuracy of all parts involved in the movement is required to prevent bouncing and faulty connections.

As a further feature of this invention, a register is suggested for the method under this invention eliminating the drawbacks of the known registers where a registering body shaped such as a disc or a ring carries setting elements arranged in a row along its circumference, which can be moved radially or axially, which are grouped according to the code alphabet to be registered, and which are set directly or indirectly through intermediate leverage by the code bars of a keyboard, while upon the setting of each group of elements the registering body is advanced to the next unused group of setting elements. In these registers, the organ exploring the registered information is supported rotatable around the rotary shaft of the registering body. The setting elements which consist of pins or similarly shaped components are explored by a roll on the exploring organ. The exploring organ is driven by gears mounting on the rotary shaft of the registering body. One of these gears is stationary while a second unit is coupled with the driving organ of the register. Another gear works into a differential gearing system which in turn drives a gear placed on the exploring organ and coupled by means of a fixed gear placed on the rotary shaft of the registering body. The clutch which makes the exploring organ effective, is under control of the position of the exploring organ; it is engaged only when the exploring organ has left its normal position. The exploring organ can reach its normal position only when no signals are registered. Emission of the code pulses is achieved through leverage under control of the exploring organ according to the set pattern of the setting elements. By the clutch, the contacts are controlled in the known manner to repeat the code pulses. On known devices, the character-group shift signal is keyed into the registering sender automatically along with the other signals. The register forwards the registered information in the keying sequence to the sender proper which sends out the signals. These known devices are avoided in the described invention since they present the drawback that in case a change is made on the teletypewriter circuit under a typing intermission it is not secure that both of the communicating teleprinters remain switched to the same type-group shift signal. With the invention at hand, it is a type-group shift signal which is sent out after each typing intermission. This can be achieved by the device that in the aforementioned registering device are provided some more setting elements, in addition to those in charge of the combination steps, which are arranged in a plane other than that of those elements registering the combination steps, and which register signals indicating the association of the respective characters with one group (f. i. letters) or another group (f. i. numerals). It is useful herewith, to provide beneath the type levers in addition to the code bars, setting the signal combination, other code bars setting the type-group shift signals associated with each character. These code bars affect the register in the same manner as do the other code bars.

It is also possible to design the aforedescribed register in a way that those setting elements which do not serve for registering the combination steps are so designed that they are not used for registering the type-group shift signal but that they are operated with the registration of the character and that they trigger the exploring organ. In such a register, the type-group shift signal is registered-in exactly as the combination steps. With this type of register, the type-group shift signal is registered by those setting elements which serve for registering the combination steps. Registration of the type-group shift signal is accomplished by two combs, the tooth-pattern of which corresponds on the one hand to the type-group shift signal, f. i. letters, and on the other hand to the type-group shift signal, f. i. numerals. In registering-in one type-group shift signal one of the combs goes into effect while in registering-in the other type-group shift signal both combs go into operation simultaneously. The character and the type-group shift signal are registered simultaneously in a way that first the type-group shift signal and then the character are explored and sent out. As mentioned above, it is one setting element that is affected through intermediate leverage when keys associated with the same group of types are operated, and one more setting element which is affected when keys associated with the other type-group are operated. These two setting elements control a triggering device which however goes into operation only whenever a shiftover is involved from one to the other group of types. This triggering device effect the aforementioned combs as explained above in a way that with one type-group it is one comb alone and with the other group of types it is both combs that are actuated. Besides the mentioned triggering device controls gearing driving the register and this in a way that in registering the type-group shift signal and the character, the register is rotated through twice the angular travel as in registering one character alone. As mentioned above, it is achieved by the method under this invention that with a given code alphabet an increased number of possible combinations is available. It is thus necessary to adapt the keyboard arrangement of a teleprinter to this increased number of possible combinations. The trend should thus be to make the keyboard arrangement of a teleprinter as similar to that of a typewriter as possible. As a consequence characters are combined arbitrarily on a joint type lever, according to another feature of this invention. With the keys so arranged, two sets of code bars are made to operate, one of them with the shift-key depressed and the other with the shift-key released, and the shift key is provided with an arm which on one set of code bars engages teeth at the bottom while the shift key and all of the remaining key levers engage teeth at the top of the code bars. The corresponding sets of code bars of the two code bar systems affect the same control element. Each set of code bars comprises f. i. 6 code bars. As mentioned above, the corresponding code bars affect through intermediate elements the same contact controlling organ, besides there are, as required by the code alphabet in use, some more code bars placed beneath the type bars, which are responsible for the shift from letters to numerals. Two bars are needed if all keys of the keyboard are so assigned that the characters combined on one key are associated both either with the numeral or letter group (group 1 or group 2) of the used code alphabet. Four bars, however, are required if one signal is associated with the letter group (group 1), the other with the numeral group (group 2). All of the code bars as well as the bars serving for shifting from one to the other group (letters and numerals, respectively) bear where they face the key levers in the known manner, a saw-tooth pattern with some of the teeth omitted as determined by the associated sequence of current pulses. All code bars of the second row bear at their bottom a tooth where they cross the shift key while all of the code bars of the first row have no teeth below but one at their top. Unlike the remaining key levers, the shift-key carries an arm reaching underneath the code bars. Each code bar engages one code lever. At their upper ends, these levers are so shaped that two adjacent code bars always affect the same contact control pins. All of the code bars are pulled towards the angular control bar by their tension springs. As is known, the control bar is operated by a cam device.

With this aforedescribed key arrangement, there must never be actuated two keys simultaneously since this would interfere with the regular performance of the set. To prevent such faulty operation, provisions have been made on teleprinters, manual perforators, teletypewriter-setting machines, etc., to avoid this. To do away with the known keyboard blocks and their complex constructional design, a key block is suggested by this invention in a way that a guiding channel is placed beneath the key levers in which blocking wedges—flat wedge-shaped pieces—are laid. At its ends the guiding channel is provided with stops limiting the possible movement of the blocking wedges. Upon depression of a key the blocking wedge associated with the key lever is forced down and the remaining blocking wedges are pushed left or right until the farthest wedges strike the aforementioned stops. The wedges are laid in the guiding channel preferably in a way that their peaks point alternatingly downward and upward. Upon termination of the downward stroke of the key lever, a triggering bar is actuated so some outside force may affect the code bars in the known manner. Those code bars as are blocked by a tooth are held in position, while the former are moved by a spring. As the teeth of the code bars are held rather small, the code bars cannot be blocked before the key lever has been displaced from normal by more than half its full stroke. This measure ensures that no release is possible by two keys. In case two keys would be depressed at once, the blocking wedges associated with the respective keys can perform each only half of the possible down stroke. As triggering by the triggering bar takes place only in the second half of key-lever motion, as mentioned above, triggering is positively prevented. With rather rapid typing it might happen that one key is depressed while the preceding one is still down due to its inertia. In the explained arrangement, the key lever depressed first is aided in its return by the blocking wedges. The advantage of this arrangement is also in the fact that it is not necessarily required to maintain close production accuracies since the key levers are not necessarily supposed to strike the center of the blocking wedges.

For teletypewriter communication it is required that the emitted sequences of current steps cause in the sending and receiving teleprinters the same character to be printed down. Such is ordinarily the case since the sets of communicating teleprinters are equipped for the same code alphabet. In order to make the method under this invention and the associated equipment cooperate with the so far known methods of teletypewriter and teleprinters, it is suggested under another feature of this invention that the identifier of the called station send back a signal indicating which kind of teleprinter is connected at the remote end, which signal affects the blocking device in the home set. Interwork of teleprinters with the use of a back signal for maintaining a key block for certain combinations or for disabling the key block can be achieved by the device that the current step combination: "Identity"? makes the key block effective and that an extra combination emitted by the identifier of the called subscriber disables this block again. As a back signal by means of the identifier one uses a current step combination of a kind which causes no character to be printed and no paper feed. To secure a positive back signal, the extra combination emitted by the identifier will preferably include a sequence of code signals. If for predominant reasons even greater reliability in the transmission of the extra combination is wanted, the key-block release may be made dependent, by introducing a certain time period within which the key block release must have become effective, and one may f. i. select a period comprising 50 incoming and outgoing code signals.

The aforedescribed securing of positive teleprinter interwork using sets operating by the known method and sets operating by the method under this invention, can be achieved under another feature of this invention even by the fact that with teleprinters operating on the new principle the key block becomes effective as early as when the teleprinter is stopped and that it is only released when the mentioned extra combination arrives from the identifier of the remote station. One achieves preferably the release of the keyblock by a fly-ball governor controlling the keyblock mechanically or electrically.

Again one may make the keyblock become effective simultaneously with the means required for practicing this invention. This may take place f. i. by energizing the switching means in the so-called control box of the teleprinter.

In cases where it is required that the keyblock be not released automatically, the incoming extra combination may bring in a signal device ordering the operator to actuate her keyblock device.

The keyblock under this invention is made in a way that a blocking bar when displaced to the left blocks one part of the keys, and when displaced to the right blocks another part of the keys which must not be actuated when a teleprinter operating on the inverted telegraph principle is communicating with one operating on the known principle, which is arranged for a minor number of characters. The blocking bar can be operated manually or automatically, so it leaves the operational area of the key bars when two identical sets communicate. According to another feature of this invention the identifier is designed as a flat disc which may be integrated with the aforedescribed registering device. The identifier designed as a flat disc carries around its circumference radially arranged exchangeable cams. These cams are preferably inserted in accordingly designed radial slots of the disc, and they are arranged in a certain sequence as required.

The combination, set on the identifier, is explored by a lever which controls the sender directly. The lever is supported at a fixed point while in exploring the disc goes through one revolution. This arrangement achieves the advantage that in revolving the identifier disc has a uniform speed so under one revolution of the identifier disc all of the set combinations are explored by the mentioned lever.

It has turned out useful to produce in the teleprinter proper the line current needed in teletypewriter communication. This is achieved under the present invention by the device that the teleprinter motor is coupled with a generator, so line current is present from the moment the teleprinter is started. The advantage is in the fact that from the presence of the teleprinter-generated line current one may ascertain that the remote station is actually ready for operation.

The translation method under this invention is not only applicable for transmitting signal combinations of a teleprinter, but it may be used to the same advantage for distortion equalizer circuits. One thus accomplishes the advantage that the now customary prolonged stop pulse is no longer required.

A more thorough understanding of the present invention may be had from the following detailed description and the accompanying drawings in which.

As described it is known to compose code signals from two types of signal elements which are transmitted in succession in a way typical of the respective code alphabet in use and the character to be transmitted.

With the so far common method, termed in the following pulsed telegraphy, one type of signal elements is symbolized by white, the other by black. If a start-stop five element code is taken as the basis of this discussion, each code signal as is apparent from Fig. 1 begins with a white start element, and it terminates with a black stop element. The five intermediate black or white signal elements form the code signal proper by their combination representative of the respective character. In single current operation, a white signal element is generated by breaking the closed-circuit current, it thus means no-current, while black refers to current flowing. In double-current operation it is common practice to transmit white as minus and black as plus polarity. This correlation has been chosen arbitrarily and might be taken in the reverse as well.

With the inverted telegraphy method under this invention, one type of signal elements will mean a change in the condition on the teletypewriter circuit, i. e. breaking or closing the closed-circuit current, or in double-current operation a polarity reversal, while the alternative type of signal elements will be indicated by continuance of the foregoing current condition on the teletypewriter circuit while the absolute value of this current condition is of no significance at all.

Figure 1:
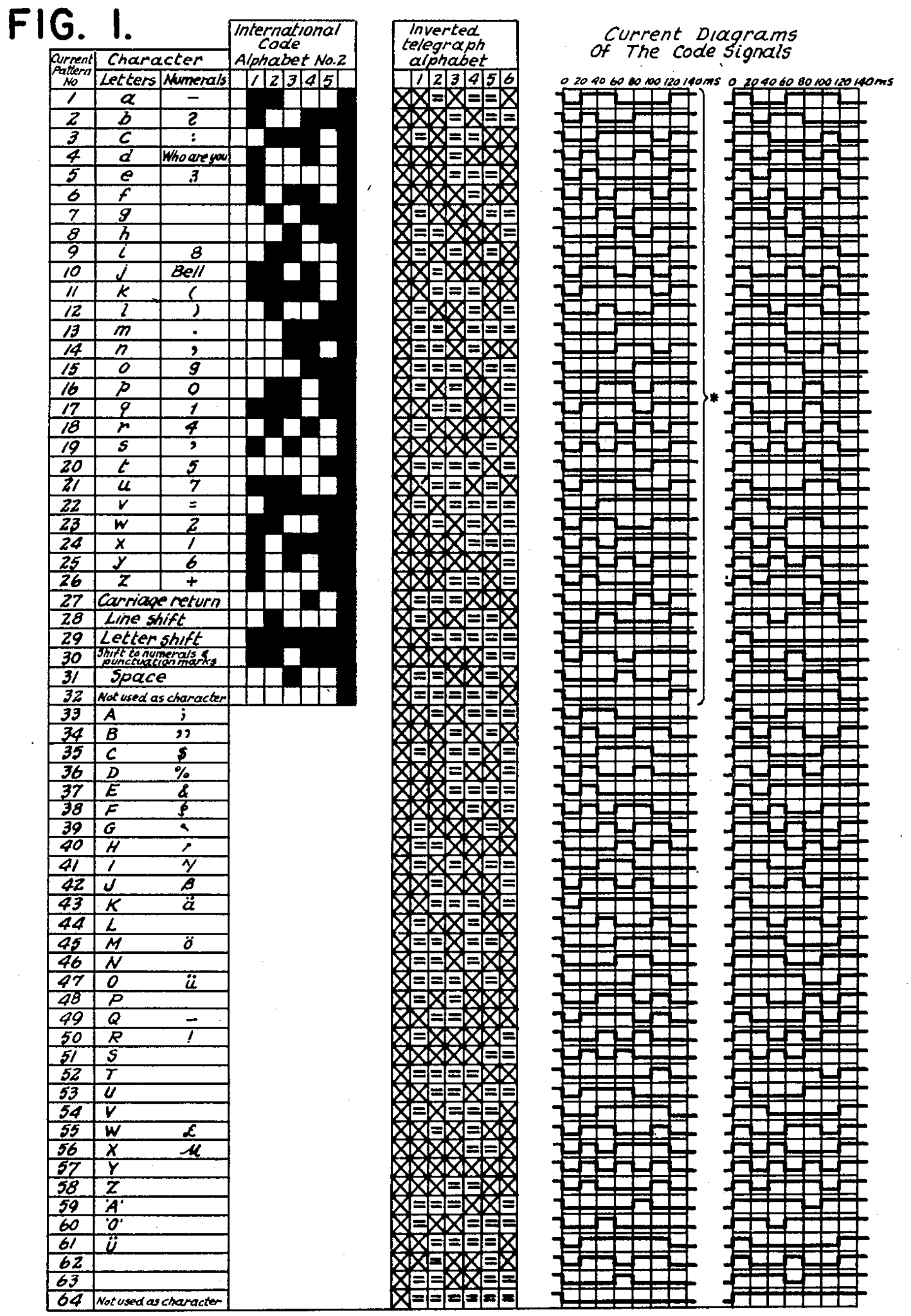
Fig. 1 is a chart giving printing telegraph code signal permutations according to the known manner and in the inverted-telegraph code including current diagrams utilized in this invention.

To avoid confusion in comparing the two methods, the two types of signal elements—as shown in Fig. 1—are symbolized with inverted telegraphy by a diagonal cross, the other by an equals sign.

A diagonal cross means a change in the state, and an equals sign continuance of the foregoing condition in the teletypewriter circuit.

If again one bases the discussion on a start-stop five element code and if white is replaced by a cross, black by an equals sign, respectively, all of the code signals begin with a cross and terminate with an equals sign as a stop element. Since an equals sign means continuance of the foregoing circuit condition, the stop signal element is always a prolongation of the foregoing signal element. This introduces the possibility to leave out the stop element entirely. One is then able to transmit a six-element code signal by the inverted telegraph method in the same time which is otherwise required for transmitting a five element code signal by the pulsed telegraph method.

According to another feature of this invention it is suggested to make the translation of the code signal from the pulsed-telegraph method to the inverted-telegraph method not in the way that white is translated into × and black into =, but by considering the so far used code signals in terms of their current wave as a current-time diagram in order to represent this current pattern by the symbols of the reversed-telegraph method.

In Fig. 1, this translation method is shown on the basis of a five element code according to the international telegraph code No. 2. As is further apparent from Fig. 1, the inverted-telegraph method can be utilized for enlarging the so far used code alphabet. The newly added signal combinations Nos. 33 to 64 can be used f. i. for introducing capitals and extra characters not used so far.

Figure 2:
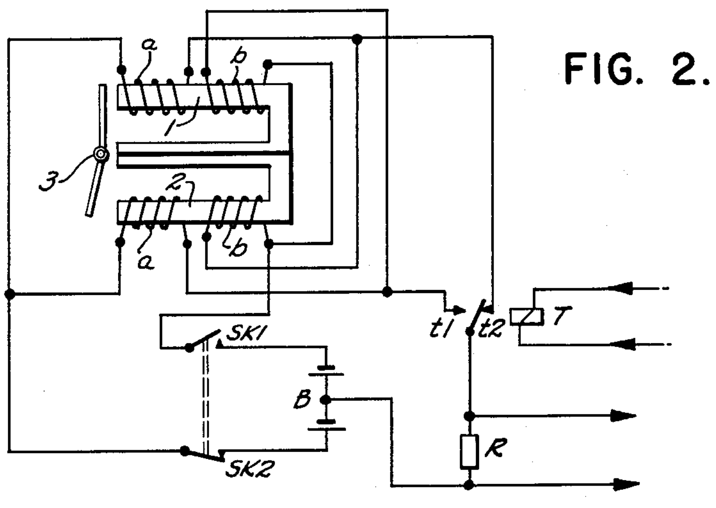
Fig. 2 is a schematic diagram of a device made according to the invention for sending and receiving code signals of the inverted type.

Fig. 2 illustrates a device used under this invention for sending and receiving code signals. The embodiment provides two solenoid coils 1 and 2, which have each assigned two windings *a* and *b*. Cooperating with both solenoids is an armature 3 which is attracted by whichever solenoid winding is energized at a given moment, to control the mechanical parts of the receiver. The sending contacts *Sk*–1 and *Sk*–2 are controlled mechanically; they are so arranged in a known manner that they break and close alternately. The line of the incoming code signals terminates in a telegraph-type relay T. The armature of the latter rests depending on polarity at *t*–1 or *t*–2.

The outgoing line may be bridged by a resistor R. The presence of this resistor is determined by the line conditions at hand. This equipment operates as follows: if one presumes that the armature of the telegraph-type relay rests at *t*–2, and that sending contact *Sk*–2 is closed, current will flow from the battery center tap B by way of resistor R and outgoing line to the telegraph type relay T and to contact *t*–2, winding 1–*a* of the receiving solenoid, and the sending contact *Sk*–2 to battery B. When the polarity reverses as the starting pulse arrives over the incoming line, the telegraph-type relay T transfers from *t*–2 to *t*–1, whereupon current will flow from the battery center-tap through resistor R and the outgoing teletypewriter circuit to contact *t*–1 of the telegraph-type relay and from there by way of winding 2–*a* of the receiving solenoid and contact *Sk*–2 to the battery. This energizes solenoid 2, so armature 3 transfers and triggers the receiving mechanism. No change occurs in the current condition in the outgoing line. Reception of the combination steps takes place in the described manner.

Figure 3:
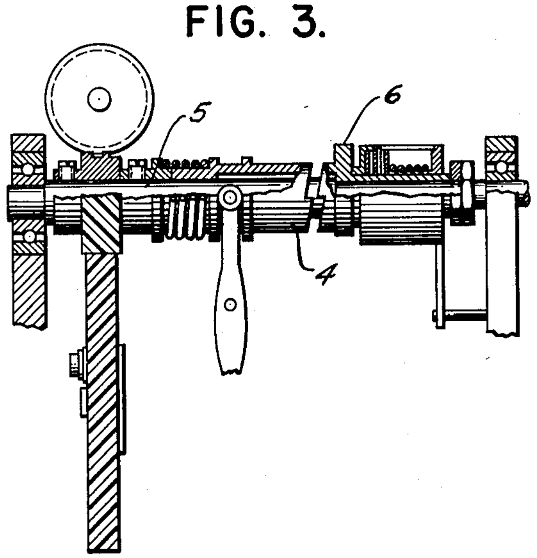
Fig. 3 is a sectional view of a clutch and cam mechanism used in connection with a printing telegraph transmitter capable of sending telegraph signals of the inverted type.
Figure 4:
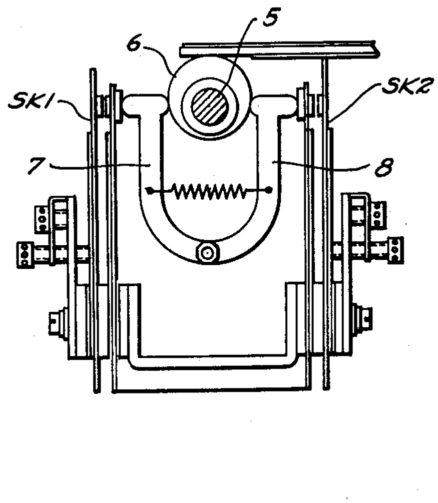
Fig. 4 is a sectional view of a cam follower and contacts controlled thereby and which cooperate with the cam shown in Fig. 3.

When signals are sent from the home transmitter, the action is as follows: It is assumed that all contacts are in the shown position. Winding 1–*a* energizes solenoid 1. When the transmitter is operated, the sending contact *Sk*–2 is opened upon the start pulse while the sending contact *Sk*–1 closes. Current will then flow from the battery by way of sending contact *Sk*–1, solenoid 2, telegraph-type relay T and contact *t*–2 to the outgoing line and resistor R back to the center-tap on the battery. Herewith the polarity has reversed in the outgoing line, and so has the energization of the receiving solenoid. Instead of solenoid 1–*a* it is now 2–*b* that is energized. Armature 3 is thus attracted by solenoid 2. The outgoing signal is thus transmitted to the line and the home receiver is caused to type it down. To emit signals by the inverted-telegraph principle one utilizes preferably an arrangement as shown in Figs. 3 and 4. Clutch 4 revolves driven by the sender shaft 5 while contact disc 6 stands still. Over the line flows current of arbitrary polarity determined by the chance of contact disc 6. In inverted-telegraphy a diagonal cross (×) corresponds to the engaged and an equals sign (=) to the disengaged, condition of this assembly. The steadily flowing line current of arbitrary direction thus corresponds to the current condion "=". If now by actuating a key-board or some other signalling device f. i. the letter "u" is triggered, the current pattern of which has been established by the international code alphabet as starting out with "white," followed by "black," "black," "black," "white," "white," and "black" as a stop pulse, clutch 4 is engaged to perform half a revolution in the start pulse; it will thereupon remain disengaged during the first to third combination pulses, to be engaged again for the fourth and fifth current pulses. By the last current pulse however it is again disengaged. If prior to the emission of the character the polarity on the line had been "plus," f. i., it will now be "minus." This reversal of the current condition relative to the state prior to the emission of a character will always occur if the number of white fields within a combination pattern is odd. With the arrangement under this invention this is of no importance, however, as no changes in the effect of the control organs or preparatory reversals of the sending contacts *Sk*–1 or *Sk*–2 are required.

Under one revolution of the rotatable disc the contacts *Sk*–1 and *Sk*–2 are operated and this in a way that during the first half-revolution contact Sk–1 is closed, contact Sk–2 opened, while during the second half-revolution contact Sk–1 is opened and contact Sk–2 is closed. Control of the sending contacts Sk–1 and Sk–2 by disc 6 is performed by way of the control levers 7 and 8 associated with the contacts Sk–1 and Sk–2. Disc 6 is so shaped around its rim or at its face that the sending contacts Sk–1 and Sk–2 move with an approximately sinusoidal acceleration.

Figure 5:
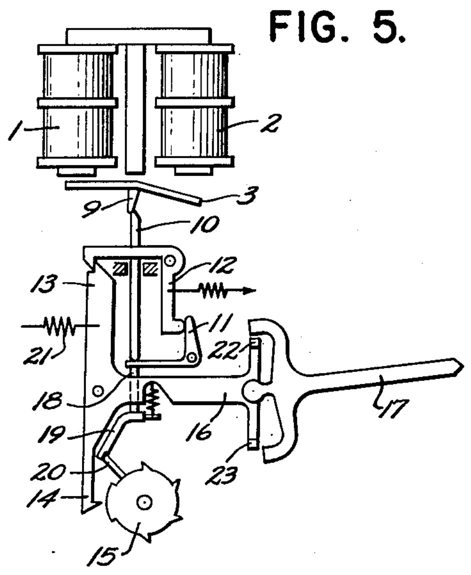
Fig. 5 is a diagrammatic representation of a solenoid system for use in a printing telegraph receiver embodying my invention.

As an example, Figs. 5 to 8 show a possible application of the receiving solenoid system. In front of the receiving solenoids 1 and 2 of Fig. 5 is an armature 3 which can take two different positions. The armature carries a point 9 which actuates a pin 10. Pin 10 and the point 9 of the armature are so shaped that in transferring from the left to the right or from the right to the left, pin 10 goes through the same axial travel. The motion of pin 10 is transferred by the angular lever 11 to the pawl 12. With its left end, pawl 12 engages the control lever 13, the lower end 14 of which is within reach of a cam 15 which mounts in the known manner on the receiving control bushing. The right end 16 of the control lever 13 is in the operating zone of a number of code swords 17 which move in the known manner. The action of the arrangement under this invention is as follows: As the first reversal takes place in the teletypewriter circuit, armature 3 will shift position, so pin 10 is displaced axially. Through the intermediate link 18, lever 19 is turned clockwise so arm 20 of the receiving control bushing is released in the known manner to go through one revolution. The receiving control bushing starts rotating so arm 14 of the control lever 13 can fall in the next depression of the cam 15 powered by spring 21. The control lever 13 is blocked however by pawl 12 to be released only when the next reversal occurs on the teletypewriter circuit. The armature 3 will then again shift position pushing pin 10 axially so lever 11 is turned counter-clockwise and pawl 12 is lifted.

Figure 6:
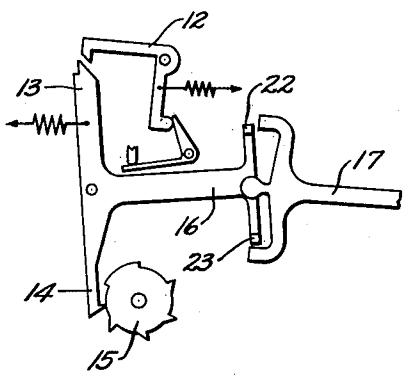
Fig. 6 is a diagrammatic representation of some of the elements shown in Fig. 5, but in a different position of operation.

Under the influence of spring 21, the control lever 16 takes the position shown in Fig. 6. As the code sword 17 is being retracted, it strikes arm 22 so it takes now the position shown in Fig. 6. After the code sword 17 has been pushed again to the right, arm 14 of the control lever 13 meets again the next cam so it is moved back to its former position and latched down by pawl 12. If after arm 14 of the control lever 13 has passed over the next cam of cam 15 no polarity reversal in the teletypewriter circuit occurs, the control lever 13 will stay at its latched position. As the code sword returns, it strikes arm 23 of the control lever 16 whereupon it takes the position shown in Fig. 5. This is evaluated in the known manner for setting the decoding organs, f. i. the receiving code bars. This embodiment given as an example has been selected arbitrarily; it depends on the geometry of the organ configuration. The characteristic feature is that the arms 22 and 23 of control lever 16 serving for controlling the code swords take one position upon armature 3 transferring from the left to the right or from the right to the left, while they take the opposite position when the armature stays in position.

Figure 7:
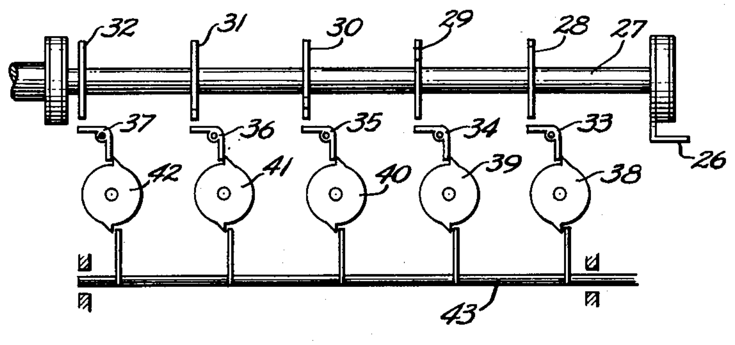
Fig. 7 is a diagrammatic representation of a portion of a printing telegraph receiver in another embodiment of my invention.
Figure 8:
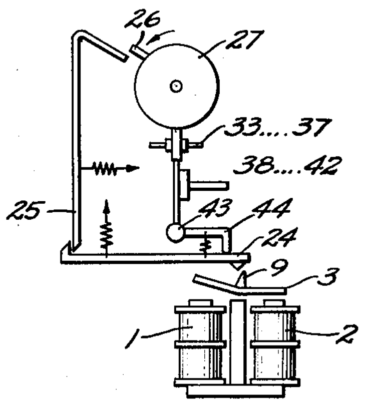
Fig. 8 is a diagrammatic end view of the structure shown in Fig. 7, together with additional control elements for controlling operation of same.

The Figs. 7 and 8 show an embodiment of a system operating on the addition principle. The first polarity reversal on the teletypewriter circuit causes again transfer of the armature 3 of the receiving solenoid so the point 9 actuates the pawl 24. This releases arm 26 of the receiving control bushing 27 for one revolution, by way of the angular lever 25. The receiving control bushing 27 starts rotating to release with the aid of the cams 28 to 32 through the coupling levers 33 to 37 the clutches 38 to 42. These clutches cannot rotate, however, as they are blocked by means of the triggering device 43. These clutches are released only if at the same time the armature 3 of the receiving solenoid transfers and thus actuates the triggering device 43. In this embodiment, the coupling disc 42 can rotate only when by means of the curved disc 32 the coupling 37 is actuated, and when at the same moment, the armature 3 of the receiving solenoid transfers, and the triggering device 43 is actuated through the intermediate lever 44.

Figure 9:
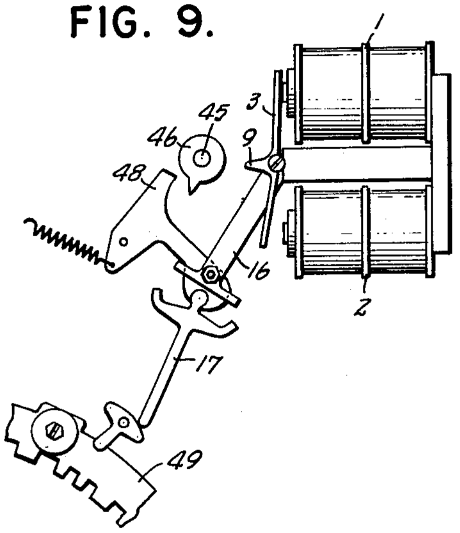
Fig. 9 is a plan view of a portion of a printing telegraph receiver, being another embodiment of my invention.
Figure 10:
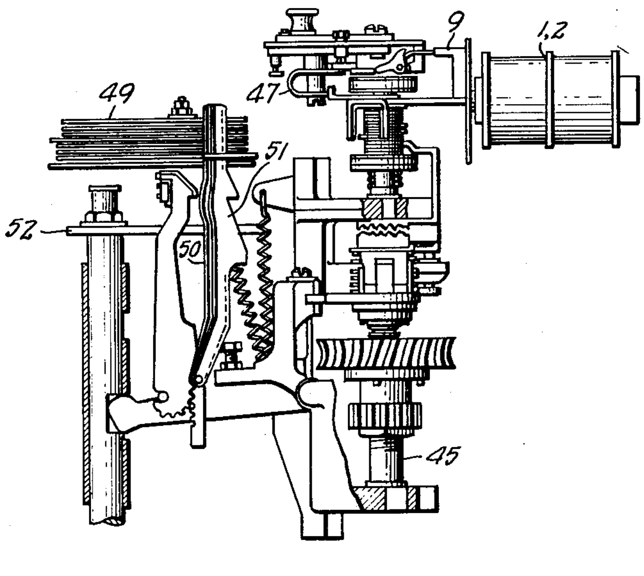
Fig. 10 is an elevational view of a portion of the structure shown in Fig. 9, together with additional elements for controlling operation of same.
Figure 11:
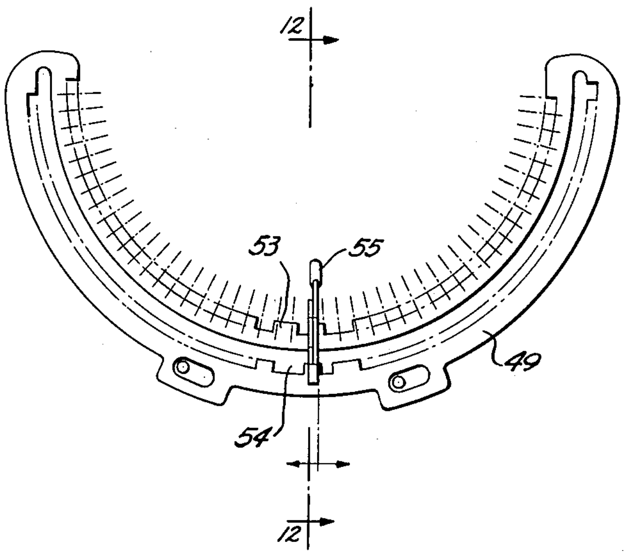
Fig. 11 is a plan view of the receiving code bars shown in Figs. 9 and 10.
Figure 12:
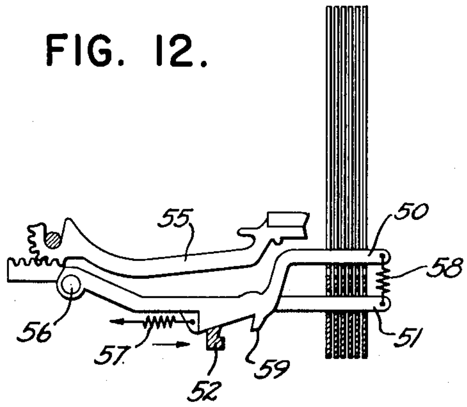
Fig. 12 is a view partly in section taken along the line A—A in Fig. 11.

Another variety of the receiving device is shown in the Figs. 9 and 10. As mentioned, current of arbitrary direction flows at normal through one of the two solenoids 1 and 2, so the armature 3 rests in consequence at the side facing the energized coil. In the variety shown in Fig. 9, the armature 3 rests against solenoid 1. The receiving shaft 45 revolves, but the receiving bushing 46 is at rest, as it is latched by the triggering device 47. When the starting pulse arrives, the telegraph-type relay in the incoming teletypewriter line deenergizes the so far energized coil to energize the other coil instead. Armature 3 thus shifts position, and in passing through its center position it operates the triggering device 47 by the nose 9 attached to the armature. This couples in the known manner the receiving bushing 46 for one revolution with the receiving shaft 45. The receiving bushing 46 thus starts rotating, and with the aid of the control organs 48 the code sword 17 is actuated for the start step which explores in the known manner the position of the code arms 16. Thereupon is actuated the first code sword 17 for the combination steps. This explores again the position of the code arm 16. If now in the time between exploration of the starting and first combination pulse of the code signal the armature has shifted position and this by current flowing through solenoid 2, this will affect the position of the code bars in the known manner. In the same way the remaining combination steps are explored and the receiving bushing 46 is stopped down after one revolution. After the code bar 49 has been set, one of the type bars 50 or 51 will drop in. Under the influence of the printing mechanism 52, the chosen signal will then be printed in the known manner. Exploration of the starting step is required as each setting of the code bars 49 by the combination steps is ambiguous in this receiving decoding system, and is unique only when correlated with the condition of the starting step. Besides each character as mentioned can be represented by two combinations of current steps, i. e. by its real current pattern and its mirrored image. To evaluate the incoming code pulses there is provided an arrangement of receiving code bars as shown in Figs. 11 and 12. Each of the receiving code bars 49 has two rows 53 and 54 of slots which are notched down according to the pulse combinations, and where one is the mirrored image of the other. To each slot system is arranged a pair 50 and 51 (Fig. 12) of type bars. One type bar of the pair 50, 51 is shaped as a rack through which the type lever 55 is actuated by way of the printing bar 52. The pair 50, 51 is interlinked at the supporting point 56. The receiving code bars 49 are set electro-mechanically as determined by the received sequence of pulses. The printing bar 52 travels in the direction of the arrow so the type bars 50, 51 powered by the tension springs 57 and 58 can explore the receiving code bars 49. If one of the type bars 50, 51 finds the slots lined up, the pair of type bars 50, 51 is moved by the printing bar 52 in the direction of the arrow because nose 59 of what type bar falls in at a time, rests in front of the printing bar 52. The type lever 55 thus swings around its shaft, and the character identified by the pulse sequence will be printed.

Figure 13:
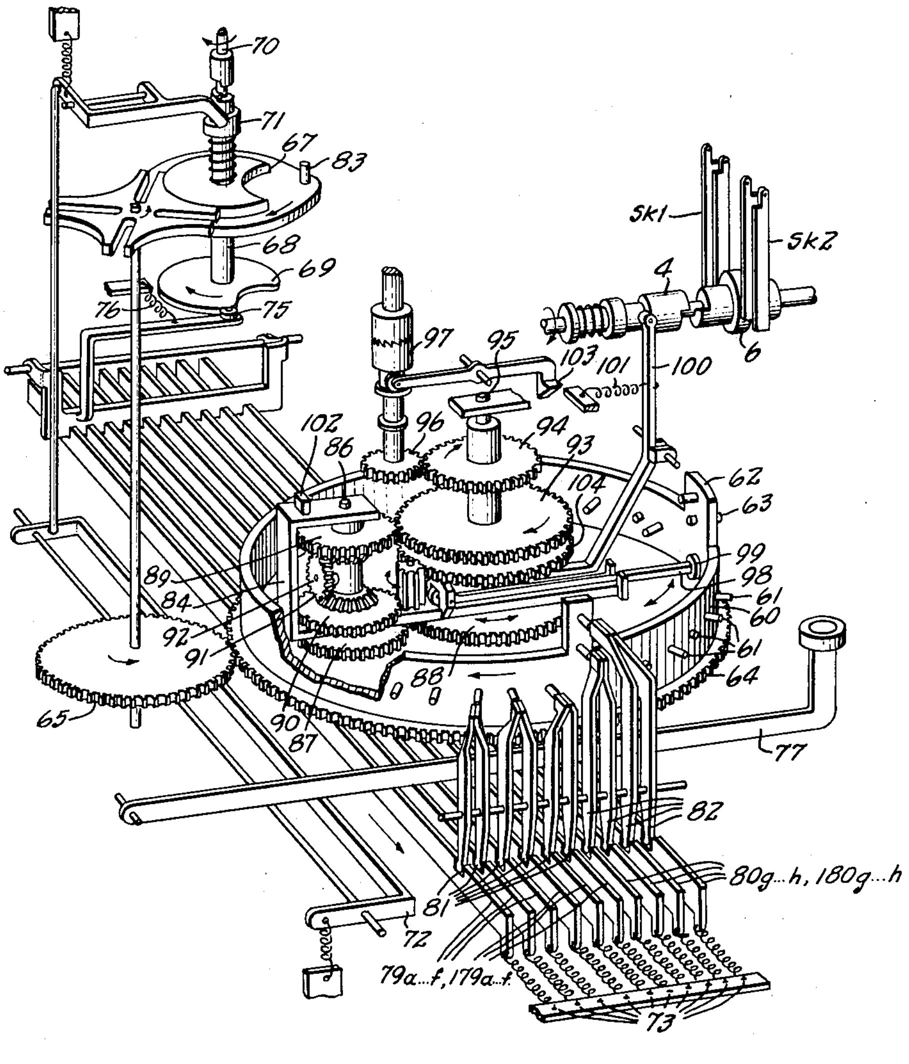
Fig. 13 is an isometric view of portions of a register device for storing signals in a printing telegraph transmitter in accordance with another aspect of my invention.
Figure 14:
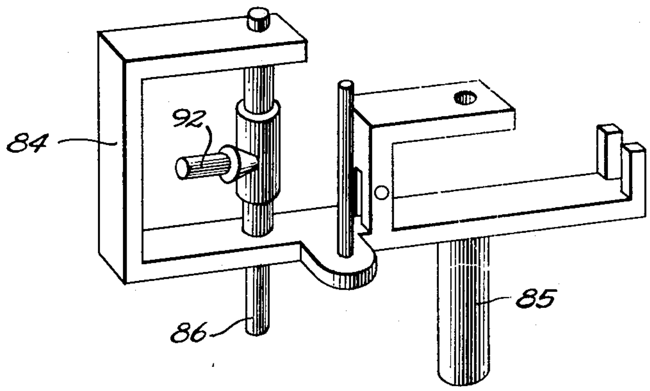
Fig. 14 is a diagrammatic representation of a bearing section for an exploring organ shown in Fig. 13.

It is known to insert a register between the keyboard of a teleprinter and the sender proper. With the present invention, use is made of a register the design of which is shown in Figs. 13 and 14 as an example. The registering disc includes a rotatable ring 60 the rim of which holds a number of pins 61, 62 and 63 so they can be displaced radially. Besides the ring 60 carries teeth engaging a gear 65. The gear 65 is linked to a Maltese motion 66, the driver 67 of which mounts on a sleeve 68 which is firmly attached to cam 69. The sleeve 68 including the driver 67 and cam 69 mounts loosely on shaft 70, and it can be engaged with shaft 70 for one revolution at a time. The clutch 71 is actuated by the triggering bar 72 when a key 77 is depressed. A lever 74 with its roll 75, powered by spring 76 rests on cam 69. With its lower extremity, lever 74 strikes the code bars 79*a* to 79*f*, 179*a* to 179*f*, 80*g* to 80*h*, and 180*g* to 180*h*, all of which are powered by springs 73. In the code bars engage a number of levers 81 and 82 which can affect the pins 61, 62, and 63 with their top ends. The pins 62, 63 serve for special functions which will be outlined below. When a key lever 77 is pushed downward it reaches the operating space of the toothed code bars 79, 179 and 80, 180. Shortly before the key has fully traveled its stroke, a triggering bar 72 is actuated which with the aid of the clutch 71 couples the sleeves 68 inclusive of the driver 67 and cam 69 to the driving shaft 70 to perform just one revolution. When now sleeve 68 starts rotating in the direction of the arrow, roll 75 will roll down from its elevated position so powered by spring 76 the lever 74 is rotated counterclockwise. All of the code bars which have no teeth at the place where the key lever has been brought down, move to the right under the influence of the springs 73. Those code bars which are blocked by a tooth are prevented from moving by the depressed key lever 77. The motion of the code bars 79, 179 and 80, 180 is transferred to the pins 61, 62 and 63 with the aid of the levers 81 and 82. These pins are thus displaced axially at the circumference of ring 60. After sleeve 68 has made about one half revolution, roll 75 will again reach the elevated portion of cam 69, to restore the lever 74, the code bars 79, 179 and 80, 180, and the levers 81 and 82. Under the remaining half-revolution of sleeve 68, the transporting pin 83 of disc 67 strikes the Maltese cross 66, to advance gear 65 by a few teeth. This turns ring 60 linked with gear 65 by its teeth 64 through a certain angle. The set pins 61, 62, and 63 are thus removed from the operating range of the levers 81 and 82, while at the same time a new set of pins ready for setting is brought within the operational reach of the levers 81 and 82. This process will repeat itself whenever a key is actuated, so the setting of the code bars typical of each key lever is registered down by the pins 61, 62, and 63 in succession along the rim of ring 60. The exploring organ comprises a bearing section 84 which for clarity is detailed in Fig. 14. Integrated with the bearing piece 84 is a shaft 85. Besides, some shaft 86 can rotate in the bearing piece. On shaft 95 mounts a gear 88 which is rigidly fixed to ring 60. Gear 88 is engaged by gear 87 which is attached to shaft 86. Also supported on this shaft are two loose gears 89 and 90. Each of these gears 89 and 90 bears two sets of teeth, spur teeth and bevel teeth. The bevel teeth of both wheels engage a bevel wheel 91 which mounts loose on an arm 92 of shaft 86. The spur teeth of wheel 89 engage gear 93 which is attached to gear 94 and which mounts jointly with the latter loosely on shaft 95. Gear 96 engages gear 94. Gear 96 is attached to coupling 97. In the bearing bracket 84, a lever 98 has been provided movable in axial direction which at its extremity carries an exploring roll 99. Lever 98 bears on lever 100 at the point where it crosses shaft 95. Lever 100 is powered by spring 101 and with its upper end it engages the clutch section 4. The clutch section 4 faces the clutch section 6 which by its cam controls the contacts SK–1 and SK–2. The action of this assembly is as follows: After ring 60 has been rotated by keyboard operation, even the exploring assembly has left its rest position by the same angular travel. Nose 102 leaves nose 103. This engages clutch 97. Gear 96 starts rotating to drive gear 89 through gears 94 and 93. Since wheel 104 is fixed, the gears 105 and 90 will meet opposition and the bevel gear 91 will spin around its shaft 92. This makes shaft 92 rotate around shaft 86. Gear 87 firmly linked to shaft 86 thus rotates the exploring assembly including lever 98 inside ring 60 while it rolls along the rim of wheel 88. This leads lever 98 with its roll 99 along the inner side of the register ring 60. Each time the roll meets a pin 61 displaced inward, it is lifted along with its lever 98. This travel is transferred through lever 100 to the clutch 4 which causes appropriate control of the contacts SK–1 and SK–2. If by keyboard action ring 60 rotates on during the exploring operation this is of no significance to the exploring operation described above. Under control of the engaged wheels 87 and 88, the exploring assembly rotates then through the same angular travel as does ring 60. Herewith the wheels 89 and 105 roll along the circumference of the wheels 93 and 104 without causing any special effect. If signals are no longer keyed into the register, the exploring organ will finally reach its original position, thus disengaging clutch 97 so the exploring organ stops down. By the arrangement under this invention it is achieved that all parts rotating with the register body are moved in a controlled manner, as all of the gears are steadily enmeshed.

Faulty connections are avoided by the elimination of pawls on which opposing accelerating forces might act at the moment when they are supposed to engage a tooth, which would cause faulty operation.

Figure 15:
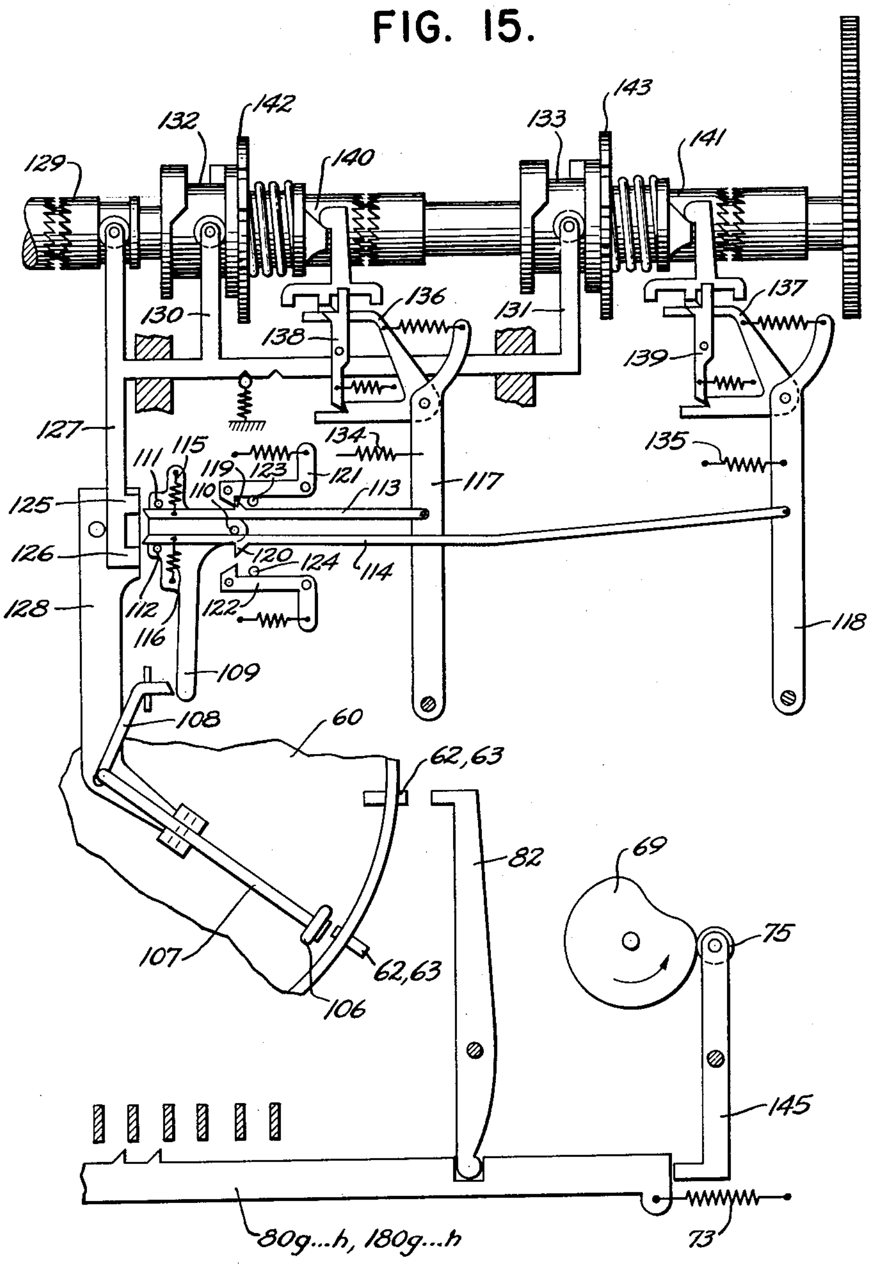
Fig. 15 is a plan view of a portion of the register shown in Fig. 13.

The described register device is used for registering-in the automatically given type-group shift signal and for special functions. In one application for registering the type-group shift signal, the pins 62 and 63 mounted along the rim of register 60 may be used. From Fig. 13 it is apparent that beneath the key levers 77 are present beside the code bars (79*a* to *f*), (179*a* to *f*) for setting the signal combination other code bars (80*g* to *h*), (180*g* to *h*) for composing the type-group shift signal associated with the character at hand. These code bars 80, 180 act through levers 82 on setting elements 62 and 63 of the shown registers. The setting elements serving for registering the type group shift signal are so arranged on the registering body that they are outside the elements 61 setting the signal combinations and arranged in a row. At the exploring side, the setting elements in charge of the type-group shift signal strike an exploring roll 106 (Fig. 15) which mounts on a lever 107. Lever 107 acts through the intermediate element 108 on the angular lever 109. The angular lever 109 is free to rotate around its pivot 110, and at its left end it carries two stops 111 and 112 against which the two levers 113 and 114 are pulled by springs 115 and 116. At its right end, lever 113 is linked to lever 117, and lever 114 is linked to lever 118. Intermediate their ends, the levers 113 and 114 carry each a nose 119 and 120 where the pawls 121 and 122 can engage. The pawls 121 and 122 are restricted however in their freedom of motion by the pins 123 and 124. The levers 113 and 114 rest with their left ends on the noses 125 and 126 of cross bar 127 and the stop piece 128 below. At its left end, cross bar 127 engages the movable clutch section 129. Cross bar 127 carries besides two noses 130 and 131 which engage guiding slots 132 and 133. The levers 117 and 118 are powered by springs 134 and 135, and at their upper ends they carry each an angular lever 136 and 137. The angular levers 136 and 137 affect each through the releasing pawls 138 and 139 in the known manner a clutch which engages the coupling sleeves 140 and 141, respectively, for one revolution at a time. The coupling sleeves 140 and 141 carry each a slot 132 and 133 and a rim cams 142 and 143. If now one or several signals are keyed into the register, the exploring organ of the register moves along with the entire register and leaves its normal position. The stopping piece 128 fixed to the exploring organ of the register thus moves to the left. Let us assume that the signal keyed into the register is associated with some "group 1." The angular lever 109 is then in the shown position. This releases the path for lever 114 so this lever moves, powered by spring 135 along with lever 118 to the left. The lower left end of the angular lever 137 hits pawl 139 so with its upper end pawl 139 effects release of the coupling sleeve 141 to be triggered for one revolution. In revolving the coupling sleeve 141 actuates by means of its rim cam 143 the sending contacts directly or indirectly so that during the first half-revolution the combination "shift group 1" sent out. During the last part of the revolution the guiding slot functions to push cross bar 127 to the left, so coupling 129 is engaged. The exploration of the register information thus starts as described above with an exploration of the keyed-in information. This action continues until either the register has been drained or until some signal associated with "group 2" is emitted.

Figure 16:
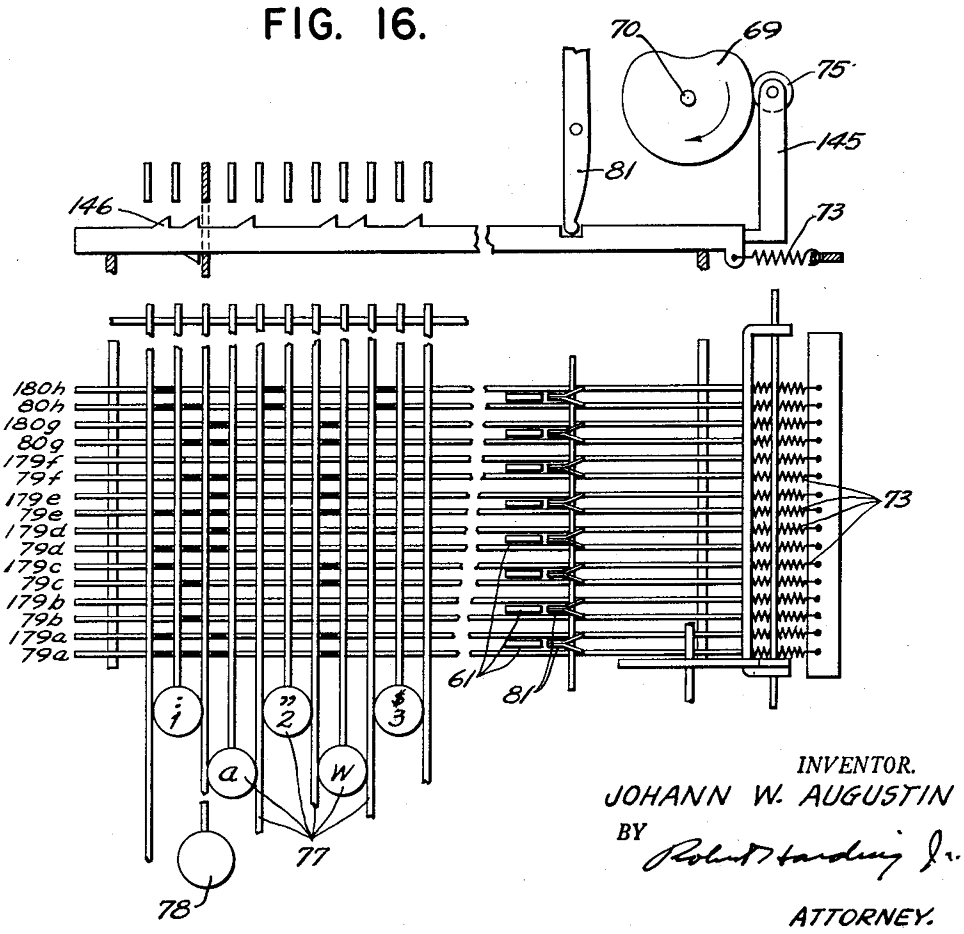
Fig. 16 is a diagrammatic representation of another embodiment of my invention used in connection with a printing telegraph transmitter.
Figure 17:
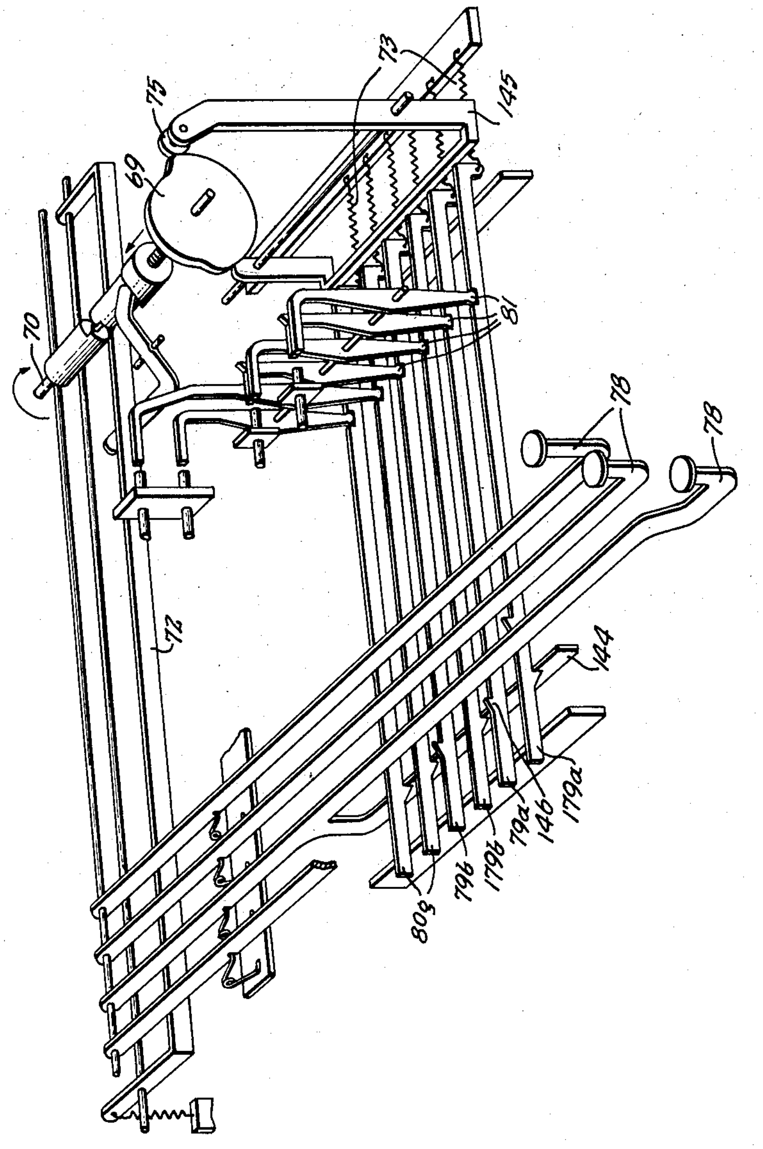
Fig. 17 is an isometric diagrammatic representation of the structure shown in Fig. 16.
Figure 18:
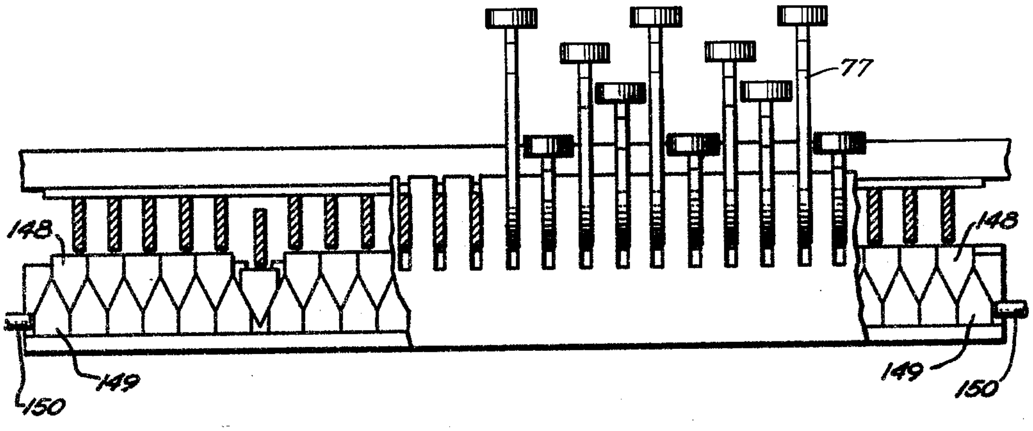
Fig. 18 is a diagrammatic front view partly in section of a key-block, for use in a printing telegraph receiver-transmitter utilizing my invention.
Figure 19:
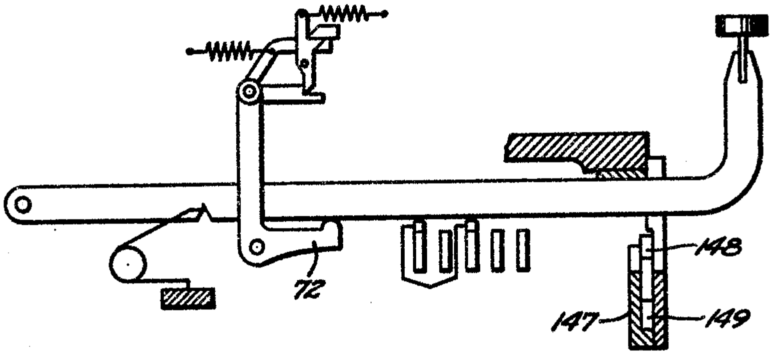
Fig. 19 is a diagrammatic end view partly in section of the structure shown in Fig. 18.
Figure 20:
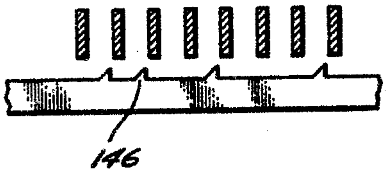
Fig. 20 is a diagrammatic representation of a code bar and its cooperating teeth shown with respect to the key levers.
Figure 21:
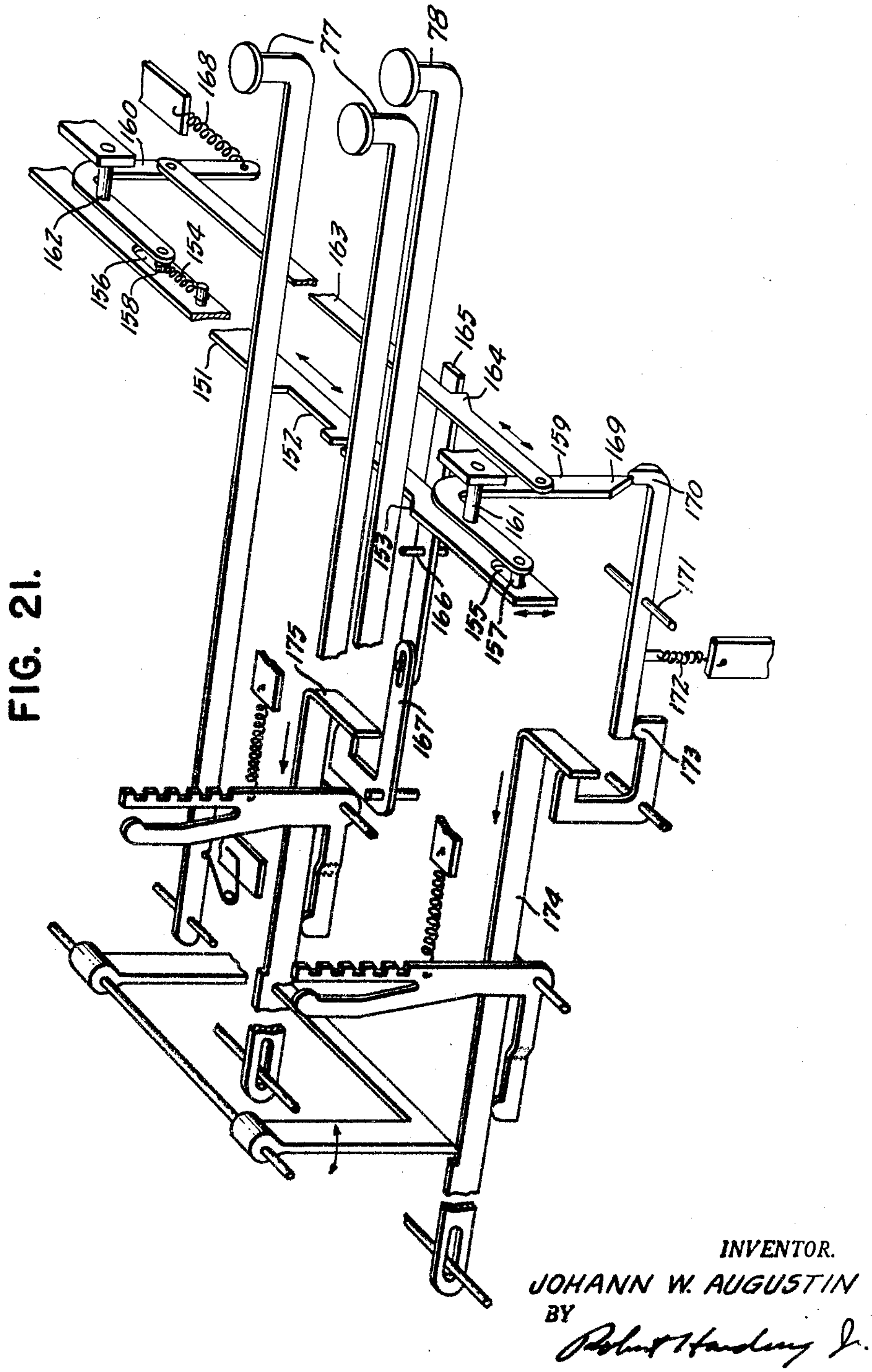
Fig. 21 is an isometric diagrammatic representation of another embodiment of my invention showing a key block arrangement utilizing a blocking bar.

There may also be used for keying the type-group shift signal into the register, as mentioned above, the setting units 61, distributed along the rim, of the register disc (Fig. 13) which as a rule serve for registering the signal combinations. Care must be taken in this case that upon actuation of a key a triggering device corresponding to the type-group shift signal is actuated which on the one hand keys the type-group shift signal into the set and which on the other hand affects a gearing unit not shown in Fig. 13 in a way that in this case the register ring travels through a path twice as long as the one necessary for receiving a signal combination. The setting pins 62 and 63 which now no longer are needed for registering type-group shift signals, are conveniently used for stopping the exploring roll 99 and for releasing same after a signal combination, or signal combinations plus type-group shift signals, have been keyed into the register. As mentioned above there are in the Figs. 16 and 17 underneath the key levers 77 and 78 two sets of code bars 79*a* to *f* and 179*a* to *f*. One of these sets of code bars becomes effective when the shift-key is not depressed while its companion becomes effective with the shift-key depressed. In the embodiment above in the Figs. 16 and 17, each set of code bars 79 and 179 includes 6 code bars *a* to *f*. The code bars 79*a*, 179*a* and 79*b*, 179*b*, respectively etc. act through intermediate links 81 on the setting pins 61. All of the code bars as well as the bars 80*g*, 80*h*, 180*g* and 180*h* serving for the shift from "group 1" to "group 2" and reversely (letters, and numerals, respectively), carry a sawtooth-pattern where they face the key levers 77 and 78 with some of the teeth omitted as determined by the associated sequence of current pulses. All of the code bars of the rows 179 and 180 carry at their lower sides a tooth where they cross the shift key 78. The code bars of row 79 and 80 have no such tooth 146*a* at their lower sides, but one at their upper sides instead. The shift-key 78 is the only key to carry an arm 144 which reaches underneath the code-bars 79 to 79*f* and 179*a* to 179*f* and 80*g* to 80*h* and 180*g* to 180*h*. Each code bar engages a code lever 81. These levers are so shaped at their upper ends that two adjacent code bars affect the same register pin 61. All of the code bars are pulled toward the control bar 145 by means of their tension springs 73. If f. i. the numeral "1" is to be typed, the corresponding key is depressed and the key lever will rest in front of the teeth 146 of the code bars 79*a*, 79*d*, 79*e*, as well as of the letter and numeral bars 80*h*. Shortly prior to the termination of the stroke of the key lever a triggering bar 72 is operated; this couples the cam 69 to the driving shaft 70 for one revolution. Roll 75 pushes the control bar 145 to the right. Those code bars which lack teeth at their upper ends at the place of the lever of the depressed key and at the lower side at the place of the shift key 78 are pulled right by spring 73. These bars actuate herewith the levers 81 which control the setting elements 61, 62, and 63. In the shown application, these are the code bars 79*b*, 79*c*, 79*f*, and the numeral bar 80*g* which are free to move right. The setting units are thus operated accordingly. At the end of the rotary motion of cam 69, the roll 75 strikes again the cam and restores all parts to their normal positions. If f. i. the punctuation mark ":" is to be printed, the shift-key 78 and simultaneously the key "1:" have to be operated. This means no blocking to such code bars as lack teeth at their upper sides near the key lever "1:", and at the upper side of the shift key 78. Since now triggering by the triggering bar takes place in the known manner shortly before the end of the key-lever stroke, the cam 69 is coupled again to its driving shaft 70 for one revolution. This moves the not blocked code bars in the same manner to the right, and the setting elements 61, 62, and 63 are set through levers 81. In the case at hand these are the code bars 179*b*, 179*d*, 179*e*, 179*f*, and the numeral bar 180*g* which set the setting pins and which thus forward the signal for exploration, emission, and printing. To prevent the character keys of a teleprinter from being operated simultaneously, key-blocks have been provided. By means of the present invention, a key-block has been suggested as shown in the Figs. 18 to 20. Below the keys 77 is placed a guide channel 147 into which are laid flat wedge-shaped pieces of blocking wedges 148 and 149. At its ends, the guiding channel 147 is provided with stops 150 which limit the possible motion of the blocking wedges 148 and 149. If some key 77 is depressed, the associated blocking wedge is forced downward. This shifts the remaining blocking wedges 148 and 149 to the right and left, respectively, until the farthest wedges strike the stops 150. Shortly before the downward stroke of a key lever 77 terminates, the triggering bar 72 is actuated which introduces an outside force to act on the code bar. The height of the teeth on the code bars 146 has been made low enough so blocking takes place only after the key lever 77 has been displaced from its rest position by more than half the key stroke. On the teleprinter under this invention it is required to provide a key block the action of which is linked with a back signal arriving from a remote teleprinter. As an example, an application of the various possibilities of such a key block is shown in Fig. 21.

A blocking bar 151 is arranged underneath the keyboard, and it carries a number of vertical slots 152 in the known manner. These slots are so distributed that a certain number of key levers 77 is blocked in the left position of the blocking bar 151 and another portion is blocked in the right position, while another portion of keys 77 is left undisturbed all the time. The blocking bar 151 has also an oblique tooth 153 beneath the shift key 78 so upon depression of the shift-key 78 it moves to the left. At its right end some spring 154 is attached to the blocking bar, under the power of which the blocking bar moves right when the shift-key 78 has been released. In the blocking bar 151 are two slots 155 and 156 into which two pins 157 and 158 engage which are fixed to the angular levers 159 and 160, respectively. These angular levers are supported in pivots 161 and 162 and interlinked by a bar 163. The bar 163 carries a nose 164 on which rests some lever 165 supported in pivot 166 and which with its other extremity engages the angular lever 167. On lever 160 mounts a spring 168. The lever 159 carries a nose 169 which can be latched in position by lever 170. At its other end, the lever 170, which is held in the turning point 171, carries a spring 172 which forces it against the angular lever 173. On the angular lever 173 can act the type bar 174 "Line Discontinuity," which is made effective in the known manner by the receiving decoding mechanism. In the same manner the type bar 175 "Identity?" can be actuated by the decoding mechanism of the teleprinter which acts on the angular lever 167.

The action of the arrangement under this invention is as follows: Let us assume that two teleprinters are supposed to communicate which are equipped for different code alphabets. To prevent the transmitting teleprinter from emitting signals which cannot be printed on the receiving teleprinter, all of the teleprinters the alphabet of which deviates from the now customary international code alphabet, and which f. i. operate on the inverted-telegraph principle have one more combination on their identifiers which is so selected that it does not affect teleprinters operating with the international code alphabet. These are f. i. the combinations Nos. 6, 7, 8, or 32 of the international code alphabet No. 2 (see Fig. 1).

Let us assume that the combination No. 32 is intended to be used herewith. Besides all of the teleprinters operating on the inverted-telegraph principle will incorporate the blocking bar arrangement as suggested by this invention. After the desired teletypewriter circuit has been completed the home teleprinter which f. i. may operate on the inverted-telegraph principle will transmit the combination "Shift to numerals and punctuation marks." Thereupon the signal "Identity?" is sent for triggering the identifier, which makes the identifier at the remote station operative. In the home teleprinter, operation of the identifier is normally prevented by a blocking device 16 which operates by the home sender operating once in sending the signal "Identity?". This blocking device causes that the home identifier is prevented from performing its routine, but it will not prevent the "Identity?"-type bar from making its stroke. The type bar 175 thus turns the angular lever 167 counter-clockwise. This rotates lever 165 in clockwise rotation, the front arm of which hits nose 164 of bar 163. The bar 163 is thus moved left and the angular levers 160 and 159 are rotated clockwise. Due to the pins 157 and 158 the blocking bar 151 is lifted so it comes in the operational zone of the keys. In the rotation of the angular lever 159 the nose 169 has been locked by lever 170 so after the pulling bar 175 has returned all of the remaining levers and bars are held in position. By the identifier performing its routine the name of the remote teleprinter is sent over the line to be printed by the home and the remote teleprinter. At an appropriate place, f. i. at the end of the identity, the identifier of the remote teleprinter will send combination No. 32 in case a teleprinter is involved which operates on the inverted-telegraph principle. If in turn a teleprinter of ordinary design, and made for the international code alphabet, is involved, no combination No. 32 will send such a back signal. The blocking bar 151 will then remain in position and effect the desired blocking of certain keys. But if the combination No. 32 of the international code alphabet follows, the type bar 174 is actuated to rotate the angular lever 173 counter-clockwise so the latter rotates lever 170 clockwise. The latching of nose 169 is thus lifted. Under the action of spring 168 the blocking bar 151 is then removed from the operational zone of the key levers so the blocking bar cannot become effective. This automatic arrangement described above can as well be simplified to the extent that the back signal given by the identifier makes a signal lamp light or operates a mechanical indicator to order the operator to actuate the blocking device of the set. The aforedescribed blocking device for preventing the emission of signals which the remote teleprinter cannot reproduce is not limited to the described embodiment. Thus it is for instance also possible to make the blocking bar effective not by the combination "Identity?", but by stopping down the set. Also can be utilized hereto the actuation of the calling key of the remote control box which serves for setting up the Teletype circuit.

While I have described above the principles of my invention in connection with a specific method and device for transmitting code signals it is to be clearly understood, that this description is made only by way of example and not as a limitation to the scope of my invention as set forth in the objects and in the accompanying claims.

What I claim is:

1. The method of communication by code signals composed of combinations of signal elements, which comprises the sequential transmission of signal elements of two kinds, a signal element of one kind being characterized by having the same electrical value as its preceding signal element and a signal element of the other kind being characterized by having a different value than its directly preceding signal element, and starting each code signal with a start signal element having a different electrical value than that of the last signal element of the preceding transmitted code signal irrespective of the absolute electrical value of the final element of the latter signal.

2. The method of communication by code signals composed of combinations of code elements, which comprises the sequential transmission of signal elements of two kinds, one kind being a change in either direction of the electrical polarity of the transmitting line and the other kind being a continuation of the prevailing electrical polarity of the transmitting line, and beginning the transmission of each code signal with a start signal element of the first kind alternating in polarity with the last signal element of the preceding transmitted code signal.

3. The method of signal communication, between transmitting and receiving units, of information represented by codal combinations of signal current elements, which comprises the initiation of a definite single signal receiving cycle of the receiving unit by transmitting a start signal current element to the receiving unit, and sequentially transmitting, during said cycle, signal current elements of a desired signal combination, said current elements being either of two kinds, one for producing a change in current applied to the receiving unit and the other for continuing the current condition of the receiving unit, and following the transmission of the last signal element of the signal combination directly by a next start signal element, without the intervention of a stop signal element, each said start signal element being a change in current applied to the receiving unit, irrespective of whether the last signal element of the preceding signal combination is of one or the other of said two kinds.

4. In a communication system, a receiving circuit for receiving during a signal cycle, a combinational code signal composed of two kinds of signal elements, one being a change in polarity, in either direction, of the receiving circuit during a phase of the signal cycle and the other being a continuation of the prevailing polarity of the receiving circuit during a phase of said cycle, each code signal beginning with a start signal element of the first kind, an electromagnetic device operated by the receiving circuit upon a change in polarity in either direction produced in the circuit by a signal element of the first kind, and signal evaluating means set in operation for an evaluating cycle upon operation of the electromagnetic device in response to the start signal element and operating during the evaluating cycle under control of the electromagnetic device in accordance with the kind and phase of the signal elements following the start signal element.

5. In a signaling system, a receiving circuit for information-representing signal combinations of sequential signal elements of two kinds, a first kind determining a change in current conditions of the circuit and the other kind determining a continuation of the prevailing current condition, with the first signal element for each combination being of the first kind and constituting a start signal, an electromagnetic device operated upon each change in current condition of the circuit produced by a signal element of the first kind, and signal combination evaluating means including a cyclic device and connections to the electromagnetic device effective upon operation of the latter in response to a start signal to initiate a single cycle of the cyclic device and thereafter effective during the cycle to coact with the cyclic device under control of the electromagnetic device to enable the evaluating means to evaluate the succeeding signal elements of the signal combination in accordance with their kind and phase in the cycle.

6. In a system such as defined in claim 5, said connections including an evaluating element enabled by the cyclic device to operate under control of the electromagnetic device only at predetermined times of the cycle.

7. In a system such as defined in claim 5, said cyclic device including a stepped cam, and said connections including an evaluating element to coact with the cam, a latch normally preventing the evaluating element from following the cam, and a linkage for releasing the latch upon operation of the electromagnetic device.

8. In a system such as defined in claim 7, said cam preventing release of the latch during coaction of the high point of a step of the cam with the evaluating element.

9. In a system such as defined in claim 5, said cyclic device including a series of cams and said connections including a corresponding series of evaluating agencies respectively individually associated with the cams and commonly associated with the electromagnetic device, each evaluating agency being operable under joint control of the associated cam and the common electromagnetic device.

10. In a communication system, a signal receiving circuit, a magnet energized upon each change in current of the receiving circuit produced by a signal, an armature alternated in position by the magnet upon successive energizations thereof, and signal decoding means including a linkage operated in one and the same way upon each alternation in position of the armature and a device coacting with said linkage to enable signal evaluation of similar successive operations of the linkage.

11. In a system as defined in claim 10, said device comprising a single cycle device and said linkage upon its first operation releasing the device for a single cycle to evaluate succeeding operations of the linkage.

12. A sending and receiving device for code signals, comprising incoming and outgoing lines, with the incoming line having a relay operated upon a change in polarity of the incoming line and transfer contacts alternated in position upon each operation of the relay, a source of potential, alternatively closed sending contacts connected to the outgoing line and the source of potential to produce a change in polarity of the outgoing line upon alternation of the closed and open condition of the sending contacts, signal decoding means including a pair of control magnets, and circuits including the sending contacts, the transfer contacts, and the source of potential for selectively energizing said magnets and for switching energization from one magnet to the other upon switching of the transfer contacts while the sending contacts are in one condition or upon alternation of the condition of the sending contacts while the transfer contacts are in one position.

13. A sending and receiving device such as defined in claim 12, said magnets comprising two magnetic cores arranged side by side and windings on said cores, and a common armature operated to one position upon energization of one magnet and to a reverse position upon energization of the other magnet.

14. A sending and receiving device such as defined in claim 12, said magnets comprising two magnetic cores and a pair of windings on each core, and said circuits energizing one winding of a pair while the sending contacts and the transfer contacts are in certain positions and energizing the other winding of the same pair while the sending and transfer contacts are in their respective alternative positions, and shifting the energization to a winding of the other pair upon a change in position of either the transfer contacts while the position of the sending contacts remain in position or upon a change in position of the sending contacts while the transfer contacts remain in position.

15. A sending and receiving device as defined in claim 12, and operating means for the sending contacts comprising a rotary cam for alternatly closing and opening the ing a rotary cam for alternately closing and opening the sending contacts during successive half revolutions of the cam, a rotating shaft, and means to clutch the cam to the shaft for a half-revolution cycle.

16. A sending and receiving device as defined in claim 15, said cam being contoured to operate the sending contacts with sinusoidal acceleration.

17. A sending and receiving device as defined in claim 12, said magnets being arranged side by side, a common armature operated from one extreme position to another upon energization of one of the magnets and returned to its former extreme position upon energization of the other magnet, and said decoding means including a control element operated in the same way upon each operation of said armature from either one extreme position to the other or the reverse.

18. A device as defined in claim 17, said armature and control element being provided with engaging camming portions for coacting upon operation of the armature from either position to the other to produce movement of the control element and coacting to latch the armature in its last operated position upon deenergization of the pair of magnets.

19. In a system for receiving and transcribing character code signals composed of combinations of signal elements, a receiving means responsive to sequentially applied signal elements forming a character code signal, exploring means controlled by the receiving means for exploring the signal elements in accordance with their phase during a signal cycle, and transcribing means including a set of code bars selectively combinationally positioned by the exploring means according to the signal elements, each code bar being formed at opposite edges with respectively mirrored slots, and character typing means including a pair of elements for sensing the combinational position of the code bars, with either element upon sensing aligned, mirrored slots in the code bars enabling operation of the typing means to type the character corresponding to the combinational position of the code bars.

20. A method of combinational code signal communication which comprises the sequential transmission during a signal cycle of a start signal component followed by signal designation components of two kinds, a signal designation component of one kind being distinguishable solely as an electrical value change with respect to the value of the signal component in the preceding phase of the cycle and being by change in one direction or the other depending on the value of the preceding component which may be of either kind, a signal designation of the second kind being characterized solely as an electrical value continuation of the value of the preceding component which may be of either kind, and the reception of the signal by center-scanning the signal components to sense their kind irrespective of their absolute value.

21. A combinational code signal communication system comprising a transmitter for transmitting upon an outgoing line a sequence of signal components of two kinds during a signal cycle, a component of the first kind being an electrical value change in either direction impressed on the outgoing line and a component of the second kind being a continuation of the electrical value present on the outgoing line during the preceding phase of the cycle, said transmitter including a sending circuit having a source of potential center-tapped by the outgoing line and a pair of contacts connected to opposite poles of said source and remaining in a previously assumed respectively open and closed condition to produce during a cycle phase a signal component of the second kind and alternately closed and opened respectively during other cycle phases to produce opposite directional signal components of the first kind on the outgoing line, and a receiver for the signals on the outgoing line, said receiver including a receiving circuit for center-scanning the signal components to differentiate between them as to kind regardless of their absolute value and irrespective of whether the components of the first kind are value changes in one direction or the other.

22. The method of conveying intelligence by signals composed of combinations of signal elements, which comprises the sequential transmission of signal elements of two kinds, each signal element of one kind being characterised by having the same value as its preceding signal element and each signal element of the other kind being characterised by having a different value than its directly preceding signal element.

23. The method of conveying intelligence by signals composed of combinations of signal elements, which comprises the sequential transmission of signal elements of two kinds representing two types of information each element representing one type of information when preceded by an element of like kind and the same element representing the other type of information when preceded by an element of different kind.

References Cited in the file of this patent

UNITED STATES PATENTS

| | | |
|---|---|---|
| 1,564,421 | Kleinschmidt | Dec. 8, 1925 |
| 2,163,302 | Zenner | June 20, 1939 |
| 2,232,166 | Colman | Feb. 18, 1941 |
| 2,323,932 | Potts | July 13, 1943 |
| 2,339,292 | Potts | Jan. 18, 1944 |
| 2,455,724 | Bacon | Dec. 7, 1948 |
| 2,477,309 | Maxwell | July 26, 1949 |
| 2,512,038 | Potts | June 20, 1950 |
| 2,524,854 | Salmon | Oct. 10, 1950 |
| 2,574,102 | Gusbisch | Nov. 6, 1951 |
| 2,614,632 | Clos | Oct. 21, 1952 |
| 2,676,245 | Doelz | April 20, 1954 |